March 31, 1953    M. A. CROSBY    2,632,956
CONTINUOUS GAUGING APPARATUS
Original Filed Jan. 5, 1947    2 SHEETS—SHEET 2
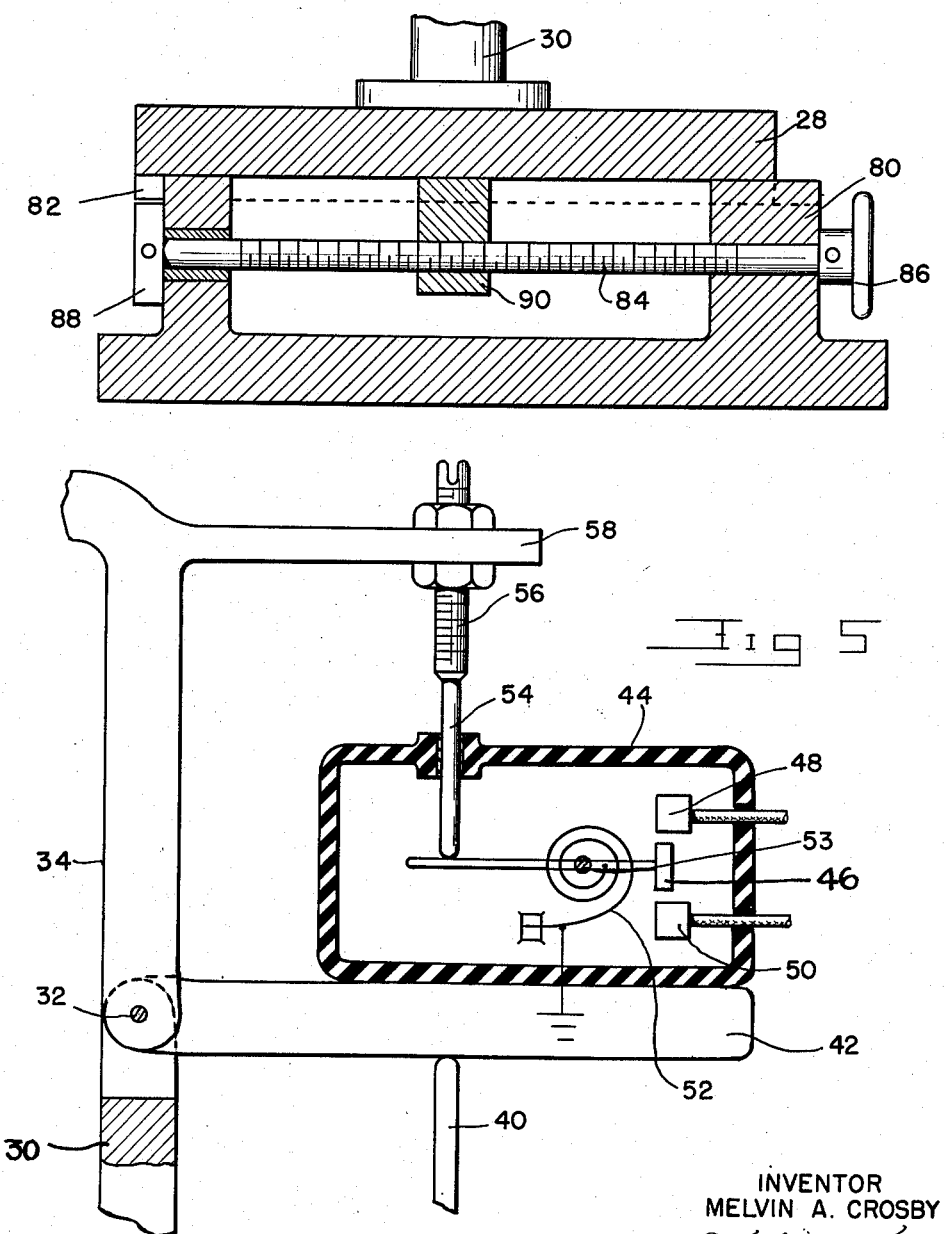
INVENTOR
MELVIN A. CROSBY
BY
ATTORNEYS Patented Mar. 31, 1953

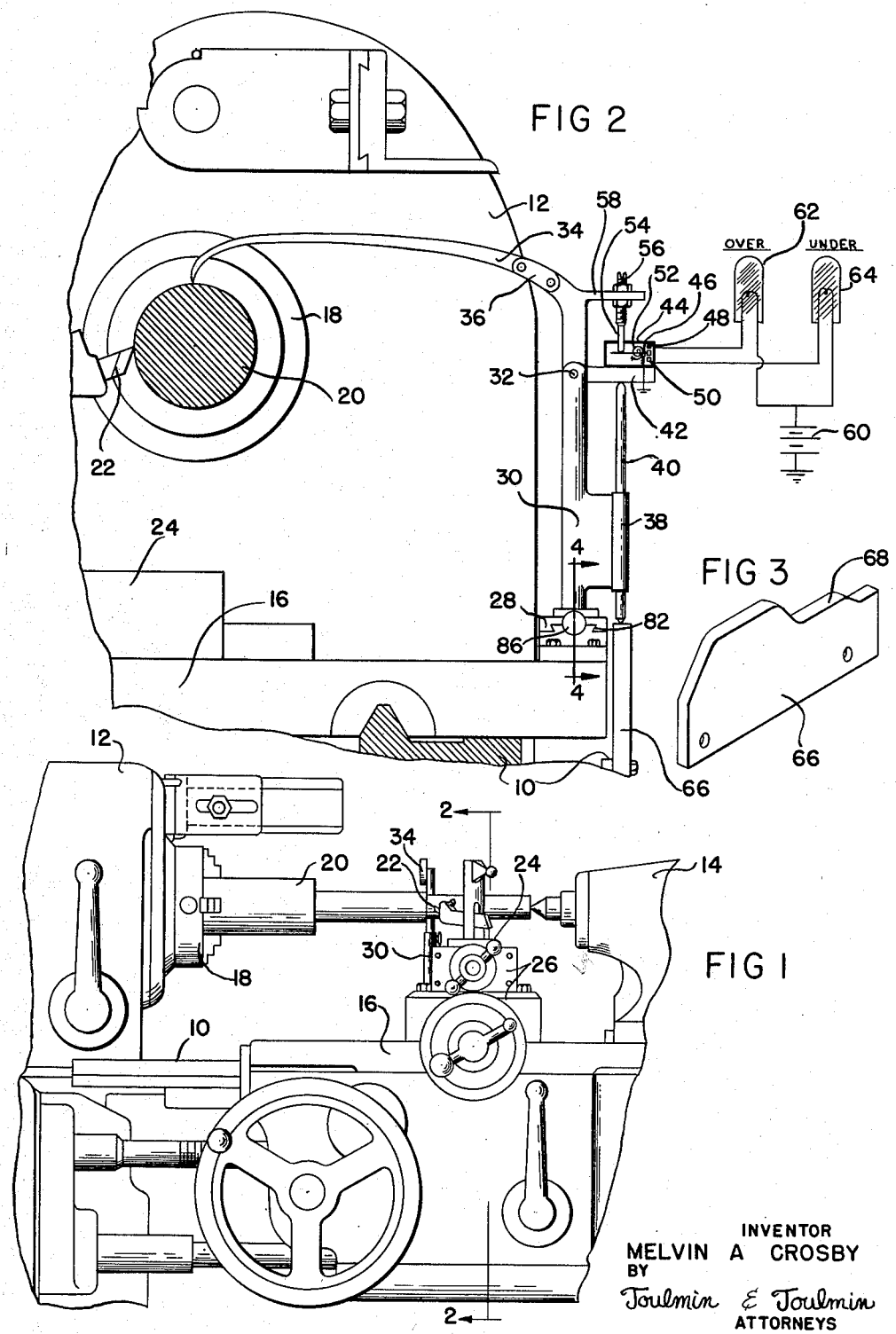

2,632,956

UNITED STATES PATENT OFFICE 2,632,956

CONTINUOUS GAUGING APPARATUS

Melvin A. Crosby, Cincinnati, Ohio, assignor to The Commonwealth Engineering Company of Ohio, Dayton, Ohio, a corporation of Ohio Original application January 5, 1947, Serial No. 724,319. Divided and this application December 14, 1949, Serial No. 132,894

5 Claims. (Cl. 33—174)

1

This invention relates to machine tools, and particularly to an indicating mechanism for machine tools for assisting the operator in the production of workpieces of the correct size and shape.

This application is a division of my co-pending application Serial No. 724,319, filed January 5, 1947.

Heretofore, for an operator to produce a workpiece of a predetermined configuration on a machine tool, it was necessary for him to measure the workpiece with gaging instruments from time to time, and to compare his measurements with a part print or other record.

Another method often employed for producing workpieces was to have the machine fitted with contouring controls so that the workpieces produced were automatically sized by the machine according to a template or pattern, or whatever other type of control was employed with the machine. In this latter case, a machine having a great deal of special equipment is required, and a set-up of this nature is not only costly, but the change from one workpiece to another involves considerable skill and time.

Having the foregoing in mind, the particular object of the instant invention is to provide an inexpensive arrangement adapted for being mounted on a standard machine tool, such as a lathe, whereby accurately sized workpieces can be produced in a minimum of time and at small cost.

Another object is to provide mechanism in combination with a lathe or other machine tool whereby a continuous indication is given of the workpiece size throughout the cutting operation.

Still another object is the provision of a machine tool having a quite inexpensive indicating device associated therewith for giving a visual indication whenever the workpiece is above or below a predetermined size.

These and other objects and advantages will become more apparent upon reference to the following description taken in connection with the accompanying drawings, in which:

Figure 1 is a fragmentary side view of a machine tool such as a lathe equipped according to this invention;

Figure 2 is a transverse section indicated by line 2—2 on Figure 1 and showing more in detail the detecting and indicating mechanism of this invention;

Figure 3 is a perspective view showing a typical template adapted for being utilized with the detecting and indicating mechanism of this invention;

Figure 4 is a longitudinal section through the feeler arm support as indicated by line 4—4 on Figure 2; and

2

Figure 5 is an enlarged detail view showing the construction of the switch for the indicating means and the manner in which it is actuated.

Referring to the drawings somewhat more in detail, there is shown in Figures 1 and 2 a machine tool such as a lathe having a bed 10, a headstock 12, and a tailstock 14. A tool supporting carriage 16 is reciprocable on bed 10 in the usual manner. The headstock may comprise workpiece holding means, such as a chuck 18 that supports workpiece 20 so that it can be driven in rotation relative to cutting tool 22 that is carried on compound 24 mounted on cross slide 26 of carriage 16.

According to this invention, and as will be seen in Figure 2, carriage 16 supports a longitudinally adjustable slide 28 on which is mounted a column member 30. At the upper end of member 30 is a pivot pin 32 and pivotally mounted on pin 32 is a feeler arm 34. Feeler arm 34 may advantageously include the detachable connection at 36 so that the end of the feeler arm which engages the workpiece can be replaced by one of a different configuration or length, if desired.

Slide 28 is supported on a base member 80 and these parts are dovetailed together as indicated at 82. A screw 84 is held against axial movement in base member 80 by the handwheel 86 and collar 88. Nut 90 on slide 28 engages screw 84 so rotation of the screw by the handwheel 86 results in adjustment of the slide on the base member.

Column 30 includes a vertically extending sleeve part 38 through which extends plunger 40. The upper end of plunger 40 bears on the bottom of an arm 42 that is pivoted on the previously mentioned pivot pin 32. Mounted on top of arm 42 is a limit switch 44 having a movable contact 46 pivoted at 53 and two fixed contacts 48 and 50 arranged on opposite sides thereof. Movable contact 46 is spring biased in one direction (in the clockwise direction as shown in Fig. 5) by a torsion spring 52 and is adapted for being moved in the other direction by plunger 54 extending upwardly from the limit switch and abutting the lower end of adjustable screw 56 carried in a projecting finger portion 58 forming a part of feeler arm 34.

Contact 46 and contacts 48 and 50 are connected in circuit with a source of electrical energy, such as battery 60, and the undersize and oversize indicating lamps 62 and 64. It will be apparent that when contact 46 is held in the position shown in Figures 2 and 5, neither of the said lamps will be lighted but a predetermined amount of movement of contact 46 in either direction from its center position will cause one or the other of the said lamps to become lighted to give a visual indication to the machine operator of relative movement between arms 42 and 34.

The actual spacing of contact 46 from contacts 48 and 50 is, of course, very small and is exagerated in the drawings for the sake of clarity.

For actuating plunger 40, thereby to bring about movements of arm 42 to follow feeler arm 34 when the workpiece being turned is the correct size, there may be a template 66 carried on the bed of the machine, as illustrated in Figure 2.

A typical template is shown in Figure 3 and will be seen to comprise the contoured upper portion 68 along which plunger 40 rides.

In operation, when the workpiece being turned is the correct size, arms 34 and 42 will move in unison as the feeler arm follows the workpiece, and the plunger 40 follows surface 68 of the template and contact 46 will accordingly remain spaced from both contacts 48 and 50 so that neither of lamps 62 or 64 will light.

However, if the workpiece departs from the correct size, then there will be a differential movement between arms 34 and 42 which will, in turn, bring about relative movement between switch 44 and screw 56 which will cause contact 46 to close on one or the other of contacts 48 and 50, thereby to illuminate one of lamps 62 and 64. The one of the lamps illuminated will indicate to the operator whether the workpiece is at that moment undersize or oversize, and he can make an adjustment in the tool setting to compensate for the particular off size condition indicated.

From the foregoing, it will be evident that this invention is adapted for use either as a simple indicating device as illustrated, or in connection with machine tools having automatic contouring devices associated therewith. In the last-mentioned case, the detecting and indicating device according to this invention is highly useful because it will immediately detect and indicate tool wear or other faults in the machine organization which might cause imperfectly sized workpieces to be produced, even though the automatic contouring controls were working perfectly.

It will be understood that this invention is susceptible to modification in order to adapt it to different usages and conditions, and, accordingly, it is desired to comprehend such modifications within this invention as may fall within the scope of the appended claims.

I claim:

1. A size indicating device for a machine tool comprising: a feeler arm having one end pivotally supported and its other end adapted for bearing on a workpiece being machined, a support for the one end of the arm, a plunger reciprocable on said support, said plunger being adapted to bear on a template at one end, a switch pivoted on said support on the same axis as said feeler arm and bearing on the other end of said plunger, and means on said arm for actuating said switch upon relative movement between said switch and arm.

2. A size indicating device for a machine tool comprising: a column adapted for being mounted on the tool support of a machine tool for movement with the support in a direction parallel to the work axis of the machine, a pivot pin in the upper end of the column, an arm pivoted on said pin and having its end adapted for engagement with the workpiece on said axis, a switch pivotally supported on said pin having an actuating member in engagement with said arm whereby relative movement between said arm and switch will actuate the latter, a plunger reciprocable on said column and bearing at one end on said switch, and a stationarily mounted template engaging the other end of said plunger.

3. A size indicating device for a machine tool comprising: a column adapted for being mounted on the tool support of a machine tool for movement with the support in a direction parallel to the work axis of the machine, a pivot pin in the upper end of the column, an arm pivoted on said pin and having its end adapted for engagement with the workpiece on said axis, a switch pivotally supported on said pin having an actuating member in engagement with said arm whereby relative movement between said arm and switch will actuate the latter, a plunger reciprocable on said column and bearing at one end on said switch, a stationarily mounted template engaging the other end of said plunger, and means for adjusting said column on said support in a direction parallel to said work axis.

4. In a size indicating device for a machine tool, a support adapted for mounting on the tool carriage of a machine tool for movement therewith in a direction parallel to the work axis of the machine, a pivot pin in the end of the support, a pair of arms pivoted on said pin and one being adapted for engagement with a work-piece on said axis, a switch on the other arm having an actuating member in engagement with said one arm so differential movement between said arms will actuate said switch, a stationary template, a plunger bearing between said template and the said other arm, and a pair of lights connected in circuit with said switch and adapted for being selectively illuminated thereby upon a predetermined differential movement between said arms in either direction from a given relative position of said arms.

5. In a size indicating device for use with a machine tool, a support adapted for being mounted to move along the work axis of the machine with the cutting means thereof, a feeler arm pivoted on said support and having an end adapted for engaging a workpiece being machined so as to be movable relative to the support in conformity with the contour of the workpiece being shaped, a template adapted for being mounted stationary relative to the work-piece, a member movably guided on the support and engaging said template to be actuated by the contour thereof when the support and template move relatively, a second arm pivoted on said support on the same axis as said feeler arm and engaging said member to be moved thereby as said member is moved by the template, and electrical means arranged so as to be sensitive solely to relative pivoting movements of said arms for indicating departures in contour of the workpiece from that designated by said template.

MELVIN A. CROSBY.

REFERENCES CITED

The following references are of record in the file of this patent:

UNITED STATES PATENTS

| Number | Name | Date |
|---|---|---|
| 1,404,545 | Richardson | Jan. 24, 1922 |
| 1,652,435 | Goodrich | Dec. 13, 1927 |
| 1,835,807 | Parker | Dec. 8, 1931 |
| 2,278,710 | Orr | Apr. 7, 1942 |
| 2,398,562 | Russell | Apr. 16, 1946 |
| 2,407,490 | Gregg | Sept. 10, 1946 |
| 1,433,585 | Warner | Dec. 30, 1947 |